(12) United States Patent
Tarasinski et al.

(10) Patent No.: US 8,469,127 B2
(45) Date of Patent: Jun. 25, 2013

(54) DRIVE SYSTEM FOR AN AGRICULTURAL OR INDUSTRIAL UTILITY VEHICLE AND METHOD FOR OPERATING A DRIVE SYSTEM

(75) Inventors: Nicolai Tarasinski, Frankenthal (DE); Rainer Gugel, Mannheim (DE)

(73) Assignee: Deere & Company, Moline, IL (US)

( * ) Notice: Subject to any disclaimer, the term of this patent is extended or adjusted under 35 U.S.C. 154(b) by 845 days.

(21) Appl. No.: 11/991,987

(22) PCT Filed: Aug. 25, 2006

(86) PCT No.: PCT/EP2006/065689
§ 371 (c)(1),
(2), (4) Date: Jul. 24, 2009

(87) PCT Pub. No.: WO2007/031397
PCT Pub. Date: Mar. 22, 2007

(65) Prior Publication Data
US 2009/0301799 A1    Dec. 10, 2009

(30) Foreign Application Priority Data
Sep. 15, 2005 (DE) .......................... 10 2005 044 180

(51) Int. Cl.
*B60W 10/04* (2006.01)
(52) U.S. Cl.
USPC .......................................... 180/65.285; 477/5
(58) Field of Classification Search
USPC ................ 180/65.21, 65.22, 65.285; 475/5
See application file for complete search history.

(56) References Cited

U.S. PATENT DOCUMENTS

| | | | | |
|---|---|---|---|---|
| 4,953,646 A * | 9/1990 | Kim | ...................... | 180/65.245 |
| 5,168,946 A * | 12/1992 | Dorgan | ...................... | 180/6.44 |
| 5,947,855 A * | 9/1999 | Weiss | ...................... | 475/5 |
| 5,988,307 A * | 11/1999 | Yamada et al. | ...................... | 180/243 |
| 6,053,833 A * | 4/2000 | Masaki | ...................... | 475/2 |
| 6,248,036 B1* | 6/2001 | Masaki | ...................... | 475/2 |
| 6,349,782 B1* | 2/2002 | Sekiya et al. | ...................... | 180/65.25 |

(Continued)

FOREIGN PATENT DOCUMENTS

| | | |
|---|---|---|
| EP | 0812720 | 12/1997 |
| EP | 1063152 | 12/2000 |

(Continued)

OTHER PUBLICATIONS

International Search Report dated Dec. 1, 2006 including the English translation.

*Primary Examiner* — Katy M Ebner
*Assistant Examiner* — Brodie Follman

(57) ABSTRACT

A drive system for an agricultural or industrial utility vehicle is provided. The drive system comprises a drive assembly that generates a mechanical torque, a first and a second electric machine, a first mechanical output interface used to drive at least one vehicle axle and a second mechanical output interface. A shaft driven by the drive assembly is rotationally connected to a shaft of the first electric machine. The second output interface is used to mechanically drive a tool which can be coupled to the utility vehicle. The shaft of the second electric machine can be reversibly connected to the first mechanical output interface. In order to allow for a connection modification of the second electric machine without producing interruptions or irregularities of torque, a third electric machine is provided the shaft of which can be reversibly connected to the first mechanical output interface.

29 Claims, 6 Drawing Sheets

U.S. PATENT DOCUMENTS

Figure 1:
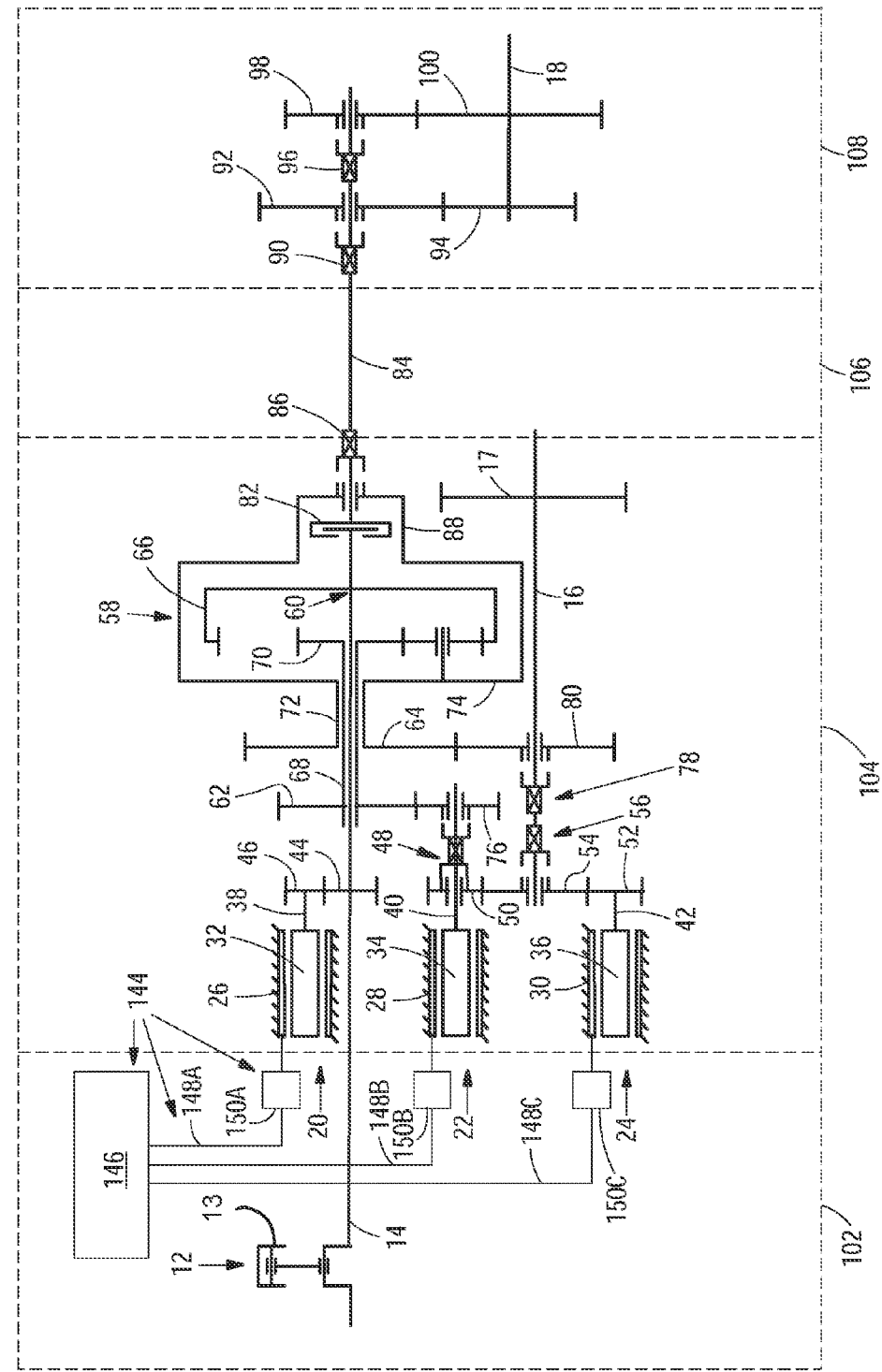

| | | | |
|---|---|---|---|
| 6,695,082 B2* | 2/2004 | Bitsche et al. | 180/65.25 |
| 6,811,508 B2* | 11/2004 | Tumback | 475/5 |
| 7,000,717 B2* | 2/2006 | Ai et al. | 180/65.235 |
| 7,311,627 B2* | 12/2007 | Tarasinski | 180/65.22 |
| 7,353,895 B2* | 4/2008 | Bitsche et al. | 180/65.25 |
| 7,395,889 B2* | 7/2008 | Sugiyama et al. | 180/65.285 |
| 7,410,437 B2* | 8/2008 | Garnett | 475/5 |
| 7,431,113 B2* | 10/2008 | Deppe | 180/65.31 |
| 7,520,354 B2* | 4/2009 | Morrow et al. | 180/65.31 |
| 2003/0100395 A1* | 5/2003 | Hiraiwa | 475/5 |
| 2004/0079565 A1* | 4/2004 | Bitsche et al. | 180/65.2 |
| 2004/0204276 A1* | 10/2004 | Tarasinski | 475/5 |
| 2008/0000702 A1* | 1/2008 | Oesterreicher et al. | 180/65.3 |
| 2008/0234098 A1* | 9/2008 | Leufgen | 477/5 |
| 2009/0301799 A1* | 12/2009 | Tarasinski et al. | 180/65.22 |
| 2010/0170732 A1* | 7/2010 | Glaser et al. | 180/65.245 |
| 2010/0186725 A1* | 7/2010 | Barker | 123/559.3 |
| 2011/0042155 A1* | 2/2011 | Tarasinski et al. | 180/65.6 |
| 2011/0098151 A1* | 4/2011 | Ziemer | 477/20 |
| 2011/0178660 A1* | 7/2011 | Tarasinski et al. | 701/22 |

FOREIGN PATENT DOCUMENTS

| | | |
|---|---|---|
| EP | 1232892 | 8/2002 |
| EP | 1466773 | 10/2004 |
| WO | 2005090108 | 9/2005 |

* cited by examiner

DRIVE SYSTEM FOR AN AGRICULTURAL OR INDUSTRIAL UTILITY VEHICLE AND METHOD FOR OPERATING A DRIVE SYSTEM

The invention relates to a drive system for an agricultural or industrial utility vehicle, preferably for a tractor. The drive system comprises a drive assembly generating a mechanical torque, a first and a second electrical machine, a first mechanical output interface used for driving at least one vehicle axle, and a second mechanical output interface. An electrical machine features a rotor, which is locked in rotation with a shaft. A shaft driven by the drive assembly is in rotational connection with the shaft of the first electrical machine. With the second output interface, a work device that can be coupled to the utility vehicle can be operated mechanically. The shaft of the second electrical machine can be reversibly connected to the first mechanical output interface. In addition, the present invention relates to an agricultural or industrial utility vehicle, in particular, a tractor with such a drive system, and also to a method for operating such a drive system.

In the sense of the present invention, a drive assembly is understood to be a motor, an internal combustion engine, a diesel engine, or a fuel cell.

For driving vehicles, electrical machines, which draw their power, for example, from generators driven by combustion engines, batteries, or fuel cells, are being used to an increasing extent. For achieving higher spread, in many cases switchable gear stages are arranged after the electrical machines, but, for the most part, the power transfer is realized without switching stages. The term spread is understood to be the range of speeds, over which the rated power can be achieved at the power take-off.

For road and rail vehicles, the procedure described in prior state of the art for achieving the desired driving power has been sufficient. Here, the spread lies on the order of magnitude of 5-10. The lowest speed at which the rated power is achieved frequently lies above 20 km/h. For agricultural utility vehicles, and especially for tractors, this spread is not sufficient. Values over 15 are necessary in order to cover the driving tasks of a tractor. The lowest speed at which the rated power is achieved lies in the vicinity of 3 km/h. Due to the low absolute speed and high towing force of tractors, shifting processes, with which engines must be shifted to a different speed range with a similar towing force, are very uncomfortable due to the transmission jump in the drive system and causes a shifting jolt.

In addition, in contrast to road and rail vehicles, tractors are usually equipped, in addition to the traction drive, with one or more other mechanical outputs for additional devices, a so-called power take-off (PTO), wherein such a mechanical output is designated according to the present invention with the second mechanical output interface.

Typically, the first electrical machine in torque flow with the drive assembly is operated as a generator and the second electrical machine—especially when it is in torque flow with the first mechanical output interface—is operated as a motor, so that the utility vehicle is advanced by the second electrical machine. In such an operating state, if the driving speed changes significantly and therefore the second electrical machine is wired differently electrically, such a change in wiring of the second electrical machine would be associated with an interruption in torque under some circumstances. However, this is to be avoided especially in tractors, because a change in wiring would be performed under load (load shifting process), otherwise a tractor would immediately come to a stop during plowing and a no-load shifting process.

For a change in wiring, torque non-uniformity could appear, which would have a negative effect on the driving comfort.

Therefore, the present invention is based on the problem of specifying and refining a drive system, an agricultural or industrial utility vehicle, and a method for operating a drive system of the type named above, through which the previously mentioned problems are overcome. In particular, a wiring change of the second electrical machine should be possible, without resulting in interruptions in torque or greater torque non-uniformity.

The problem is solved according to the invention by the lesson of Claim 1. Other advantageous constructions and refinements of the invention emerge from the subordinate claims.

According to the invention, a drive system of the type named above is characterized in that a third electrical machine is provided, whose shaft can be reversibly connected to the first mechanical output interface, and that the shafts of the second and third electrical machine can be coupled to each other synchronously.

According to the invention, at first it was recognized that changes in the operating state of a single electrical machine provided for driving the vehicle is usually possible only with an interruption in torque or at least torque non-uniformity. If, however, two electrical machines are used for this one electrical machine used for driving the vehicle, for switching an operating state of one electrical machine or for switching the operating states of both electrical machines, an interruption in torque and a torque non-uniformity are at least largely prevented, in that the two electrical machines used for driving the vehicle are coupled to each other synchronously. In this way, namely, for example, an electrical machine can be brought into a no-load state, while the other electrical machine provides for driving of the vehicle without torque interruptions at this time. If necessary, this electrical machine can even be overloaded for a short time, so that no power losses occur during the shifting process. As soon as the shifting process of one electrical machine is complete, this can again establish a torque and transfer this torque, for example, to the first mechanical output interface.

The first mechanical output interface is used for driving at least one vehicle axle. If the agricultural or industrial utility vehicle is constructed in the form of a tractor, the first mechanical output interface is used, in a very especially preferred way, for driving the wheels or rear axle of the tractor. Optionally, the first mechanical output interface is also used for driving the wheels of the front axle of the tractor, which can be coupled, for example, by means of a coupler. Although the second mechanical output interface is used for mechanical driving of a work device, which can be coupled to the utility vehicle, the second mechanical output interface can also or alternatively be used for driving another mechanical utility vehicle, for example, for driving a threshing tool of a combine harvester.

Now, in principle it could be provided that a coupling according to the invention of the second and third electrical machines is provided only at certain times and such a coupling can be realized, for example, with the aid of an extra gear shifting point provided for this purpose. In a very especially preferred embodiment, however, the shafts of the second and third electrical machines are always coupled to each other synchronously. This could be realized, for example, by means of a gearwheel or a spur gear, which meshes with corresponding gearwheels or spur wheels locked in rotation with the appropriate shafts of the two electrical machines. The gearwheel or spur wheel could be arranged in the drive system so that it can be locked in rotation with the first output interface. In actuality, for this purpose a gear shifting point is provided, with which a rotationally locked connection between the gearwheel (and thus the rotors of the two electrical machines) and the first mechanical output interface can be produced.

In most operating states of the drive system, it is provided that at least one of the electrical machines is operated as a generator and that one of the two other electrical machines is driven with the electrical energy generated by the first electrical machine.

An electrical machine operated as a motor or as a generator preferably has a synchronous machine or an asynchronous machine or could operate according to the principle of a synchronous machine or an asynchronous machine. Thus, for each electrical machine, an inverter or converter could be provided. Because electrical current is generated with the aid of an electrical machine operated as a generator, which is driven by the drive assembly and the drive assembly has a variable rotational speed as a function of the corresponding driving situation of the utility vehicle, the electrical alternating current generated by the electrical machine operated as a generator has a variable or dependent frequency. For converting the electrical alternating current of variable frequency into electrical alternating current of a predetermined, essentially constant frequency, such an inverter could be used. With the inverter, the electrical alternating current of variable frequency generated by the electrical machine operated as a generator could be converted first into direct current and then into alternating current of the given frequency. With this alternating current, for example, an electrical machine or other electrical components could then be driven. Preferably, a direct current circuit with at least one electrical storage device is provided. This direct current circuit is powered by the inverter and could be used, so-to-speak, as an intermediate current circuit, to which electrical loads that can also be operated directly with direct current could be connected. The electrical storage device could be constructed in the form of a battery or a correspondingly dimensioned capacitor. Also very especially preferred there is at least one additional inverter, with which the direct current can be converted into an alternating current of a given frequency or into an alternating current of a given course of variable frequencies. In this way, for example, at least one electrical machine or electrical load can be operated, which is driven with alternating current.

In a very especially preferred embodiment, the electrical machines have essentially the same construction and/or have essentially comparable power characteristics. Thus, for agricultural utility vehicles and especially for tractors, a favorable configuration of the drive system according to the invention can be achieved, wherein, for example, a relatively simply structured control of the second or third electrical machines permits switching between different operating modes without shifting jolts, because the power characteristics of the second and third electrical machines are essentially identical and driver stages or power electronic assemblies can have essentially identical constructions.

According to a preferred embodiment, a switching device is provided, with which at least two electrical machines operated as motors are connected to each other electrically in parallel or in series. The two electrical machines are connected to each other electrically in series typically in an operating state with low driving speeds and high towing powers and operated with relatively low rotational speeds under the output of a relatively high torque. In such an operating state, relatively high currents flow and relatively small voltages are applied. If the utility vehicle is to be shifted to an operating state with higher driving speeds, with the switching device the two electrical machines operated as motors could be connected electrically to each other in parallel, so that a larger rotational speed is possible for a smaller torque output. In such an operating state, relatively small currents flow for each machine and relatively high voltages are applied. Through suitable switching between a parallel to a series circuit for the electrical machines, in a very especially advantageous way, too great a field weakening range can be avoided in the operation of one or more electrical machines.

If two electrical machines operated as motors are provided, for changing the load state of at least one electrical machine, in particular, the second and the third electrical machines, two electrical machines of an electrical series circuit can be converted into an electrical parallel circuit or from an electrical parallel circuit into an electrical series circuit.

In a very especially preferred way, as a function of each operating state of the drive system or the utility vehicle, the windings of an electrical machine operated as a motor can be connected internally electrically in parallel, in series, in a star arrangement, or in a triangular arrangement. Corresponding switching elements are known from the state of the art and are offered, for example, by the company Moeller Electric AG, Im Langhag 14, CH-8307 Effretikon. If the windings of an electrical machine operated as a motor are to be switched internally from a star to a triangle circuit, another electrical machine operated as a motor can provide a torque-free drive of the vehicle—during a synchronous coupling of the two electrical machines.

According to a very especially preferred embodiment, for changing the wiring of an electrical machine operated as a motor, another electrical machine coupled synchronously to this electrical machine is first controlled so that operation free of torque interruption is possible with the other electrical machine for a no-load state of the electrical machine to be switched. The wiring of the electrical machine to be switched can be changed in the load state of the other electrical machine. For this purpose, corresponding control software could guarantee a soft shifting process in the control and/or switching device controlling the electrical machines.

In a preferred refinement, at least two electrical machines operated as motors can be controlled, such that possible torque non-uniformity of a single electrical machine could be at least largely equalized by another electrical machine on the basis of the synchronous coupling. This is provided especially for an operating state of the drive system, in which the electrical machines operated as motors are coupled to the first and/or second mechanical output interfaces. For an extensive equalization of the torque non-uniformity, the non-uniformity must be distributed in a defined way, for example, the distribution could be of a statistical nature or the resulting torque non-uniformity could be phase-shifted relative to each other.

Preferably, an electrical machine is operated at least to a large part such that a given field weakening range of an electrical machine is not exceeded. If the drive system for a tractor is provided, the electrical machines provided for driving the tractor are operated nearly always in the field weakening range, because in this way the rotational speed of the electrical machine can be changed for a maximum output power. For example, it is monitored with a corresponding control or regulation unit that a given field weakening of an electrical machine is not exceeded, because otherwise the torque flow between an electrical machine and the first mechanical output interface could be interrupted.

Preferably, at least two of the three electrical machines are arranged and/or held in and/or on a common housing arrangement. In other words, the combination of at least two electrical machines into a common housing arrangement enables a modular construction of these drive components.

In a very especially preferred way, at least two of the electrical machines are arranged spatially adjacent to each other. For achieving a compact construction, the electrical machines could be arranged directly adjacent to each other, such that the housings of the electrical machines essentially border each other. In general, the electrical machines are arranged spaced apart from each other together in one housing arrangement, wherein the corresponding distance between two electrical machines can depend on various factors, for example, the available installation space in the utility vehicle or the requirements with respect to cooling the electrical machines.

In DE 10 2004 012 767, which had not yet been published at the filing time of the present patent application, three electrical machines are arranged spatially one behind the other, such that the rotors of the electrical machines are arranged coaxially to each other. Such an arrangement (one behind the other) of the electrical machines is basically advantageous when, in the length direction of the rotors of the electrical machines—typically oriented in the direction of the vehicle longitudinal axis—sufficient installation space is available in the vehicle. This is not always the case in agricultural and industrial utility vehicles and especially for tractors. Therefore, in an especially preferred embodiment, at least two of the electrical machines are arranged spatially, such that their shafts are oriented essentially parallel and offset to each other. Through such an arrangement of the electrical machines, the necessary installation space in a direction perpendicular to the vehicle longitudinal axis is greater than is the case for the arrangement of the electrical machines one behind the other. Therefore, however, the installation space in the longitudinal direction of the rotors of the electrical machines or in the vehicle longitudinal direction is smaller than for an arrangement of the electrical machines one behind the other, which is especially advantageous for tractors.

In a very especially preferred embodiment, a fourth electrical machine is provided. The fourth electrical machine can be coupled—in particular, also reversibly—with the first or the second mechanical output interface. The fourth electrical machine is preferably arranged spatially adjacent to one of the first to third electrical machines. Thus, for example, the fourth electrical machine could also be arranged in the housing arrangement, in which the first, second, and third electrical machine is also arranged, so that a compact arrangement and/or a common cooling of the four electrical machines is possible.

For summing the torque generated by the drive assembly and the torque generated by an electrical machine, preferably a summing gear with three mechanical interfaces could be provided. The first interface of the summing gear could be coupled to a shaft driven by the drive assembly. The second interface of the summing gear could be coupled to the shaft of an electrical machine. The third interface of the summing gear could be coupled reversibly with the first mechanical output interface and/or with the second mechanical output interface of the drive system.

In actuality, the summing gear could have a planetary gear. According to a preferred embodiment, the shaft driven by the drive assembly is locked in rotation with the ring gear of the planetary gear. The planet carrier of the planetary gear can be coupled reversibly with the first output interface. The sun-wheel of the planetary gear can be coupled reversibly with the second, third, or fourth electrical machine. Such a summing gear allows in a very especially advantageous way, very flexible possible uses of the drive system, especially for a second output interface (power take-off) that can be operated independently of the first output interface, which is discussed in detail in the description of the figures. In this connection, it could be provided that the shaft of the fourth electrical machine is in rotating connection with the sun wheel of the planetary gear. Just like the rotor of the first electrical machine can be in rotating connection constantly with a shaft driven by the drive assembly, the rotor of the fourth electrical machine could also be in rotating connection constantly with the sun wheel of the planetary gear. However, a gear interface could be provided, with which the first and/or the fourth electrical machine can be decoupled from the shaft driven by the drive assembly or from the sun wheel of the planetary gear.

The second output interface can be driven in a preferred refinement, such that the planet carrier of the planetary gear is coupled to the second output interface. Alternatively or additionally, the second output interface can be driven, such that a shaft driven by the drive assembly is reversibly coupled to the second output interface. For this purpose, a friction-fit coupling or a plate coupling or a claw coupling could be provided, wherein the plate coupling could be activated electromagnetically or hydraulically. Thus, in principle there is the possibility to drive the second output interface with only one portion or with the entire mechanical torque generated by the drive assembly, if a corresponding coupling is engaged. Furthermore, the second output interface can be operated merely by the torque applied to the planet carrier of the planetary gear, if another corresponding coupling is engaged. It is also conceivable that the second output assembly is operated both by a part of the mechanical torque generated by the drive assembly and the torque applied to the planet carrier of the planetary gear. In this case, both couplings are engaged and the mechanical torque are summed accordingly. This requires, however, that the components of the drive system are operated, such that it does not result in blockage of the drive system.

In particular, when the drive system according to the invention is used for tractors, a first operating state is provided, in which the first electrical machine is operated as a generator and the second and the third electrical machines are operated as motors and connected to the first mechanical output interface. The torque generated by the second and third electrical machine is transmitted to the first mechanical output interface. In this operating state, the traction drive of the tractor is realized exclusively by the two electrical machines. In this operating mode, a correspondingly equipped tractor can have, for example, a speed of 0-25 m/h for forward or backward travel. Here, it is also possible to realize a power take-off mode by means of the second mechanical output interface—especially also continuously—which is discussed below.

Furthermore, a second operating state is provided, in which the fourth electrical machine operated as a generator can be driven with a portion of the mechanical torque generated by the drive assembly. The second and third electrical machines are operated as motors. The mechanical torque generated by the second and third electrical machines can be transmitted with another portion of the mechanical torque generated by the drive assembly to the first mechanical output interface. This operating mode represents a power-diverted gear structure in a "speed-split" configuration. The power output by the drive assembly branches in the summing gear and is summed again at the first mechanical output interface. Thus, a portion of the power is transmitted mechanically and another portion of the power is transmitted electrically. This operating mode is especially suitable for a slow forward travel of up to 25 km/h and the heavy towing work of a tractor.

A third operating state is provided in which the first electrical machine is operated as a generator. The fourth electrical machine is operated as a motor. The mechanical torque generated by the fourth electrical machine can be summed with the mechanical torque generated by the drive assembly and transmitted to the first mechanical output interface. In this way, a power-diverted gear structure is realized in a "torque-split" configuration. This operating mode is used preferably for driving of the tractor with a higher traveling speed, for example, 25-50 km/h.

In an especially preferred embodiment, the fourth electrical machine is operated as a motor. The torque generated by the fourth electrical machine and—if a corresponding coupling is engaged—at least one part of the mechanical torque generated by the drive assembly can be transmitted to the second mechanical output interface. Thus, the second mechanical output interface or power take-off (PTO) of the tractor can be driven, on one side, merely by the fourth electrical machine, essentially independently of the instantaneous rotational speed of the drive assembly. On the other hand, the second mechanical output interface can be simultaneously driven by the fourth electrical machine and at least by a portion of the mechanical torque generated by the drive assembly.

Figure 2:
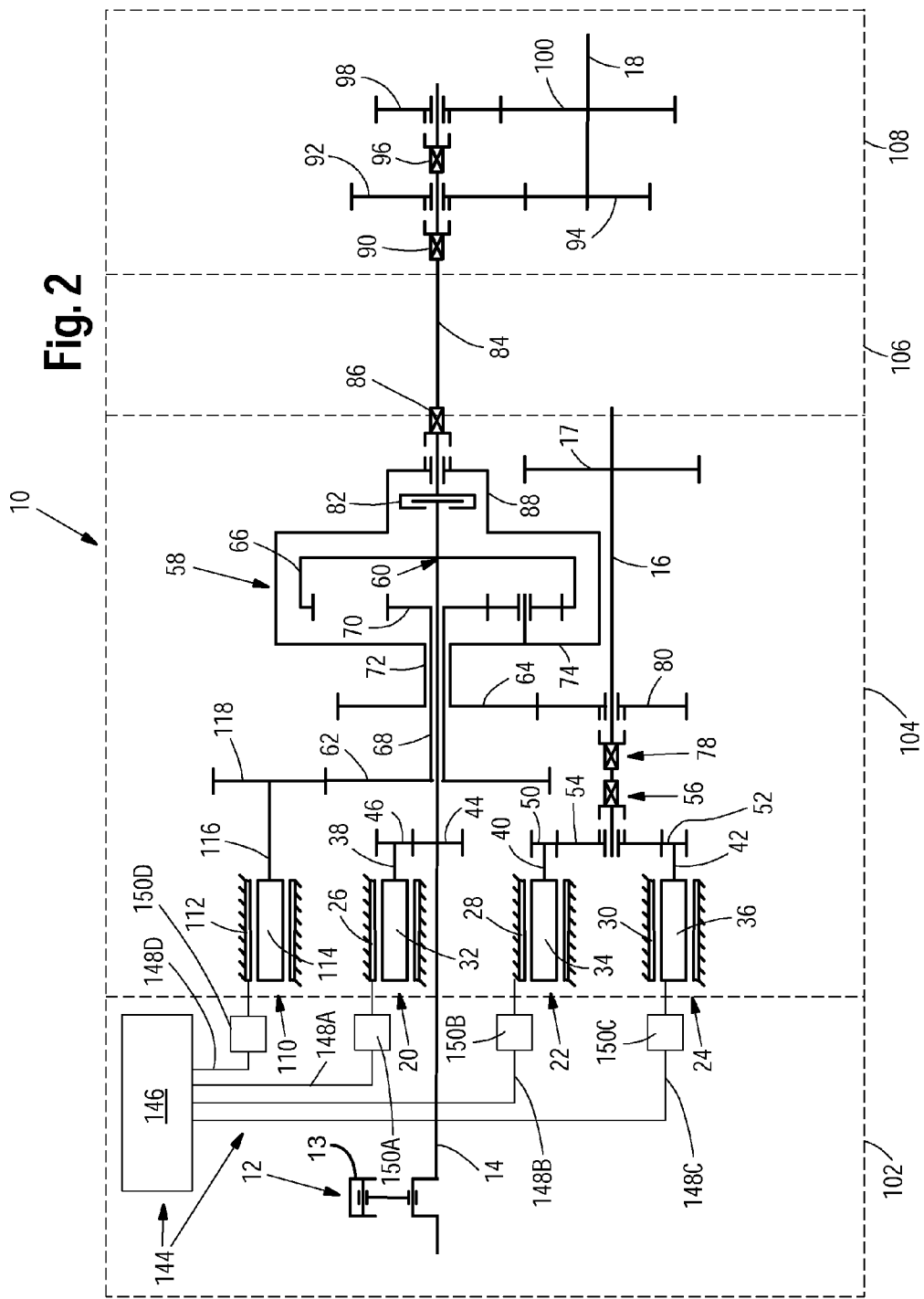
Figure 3:
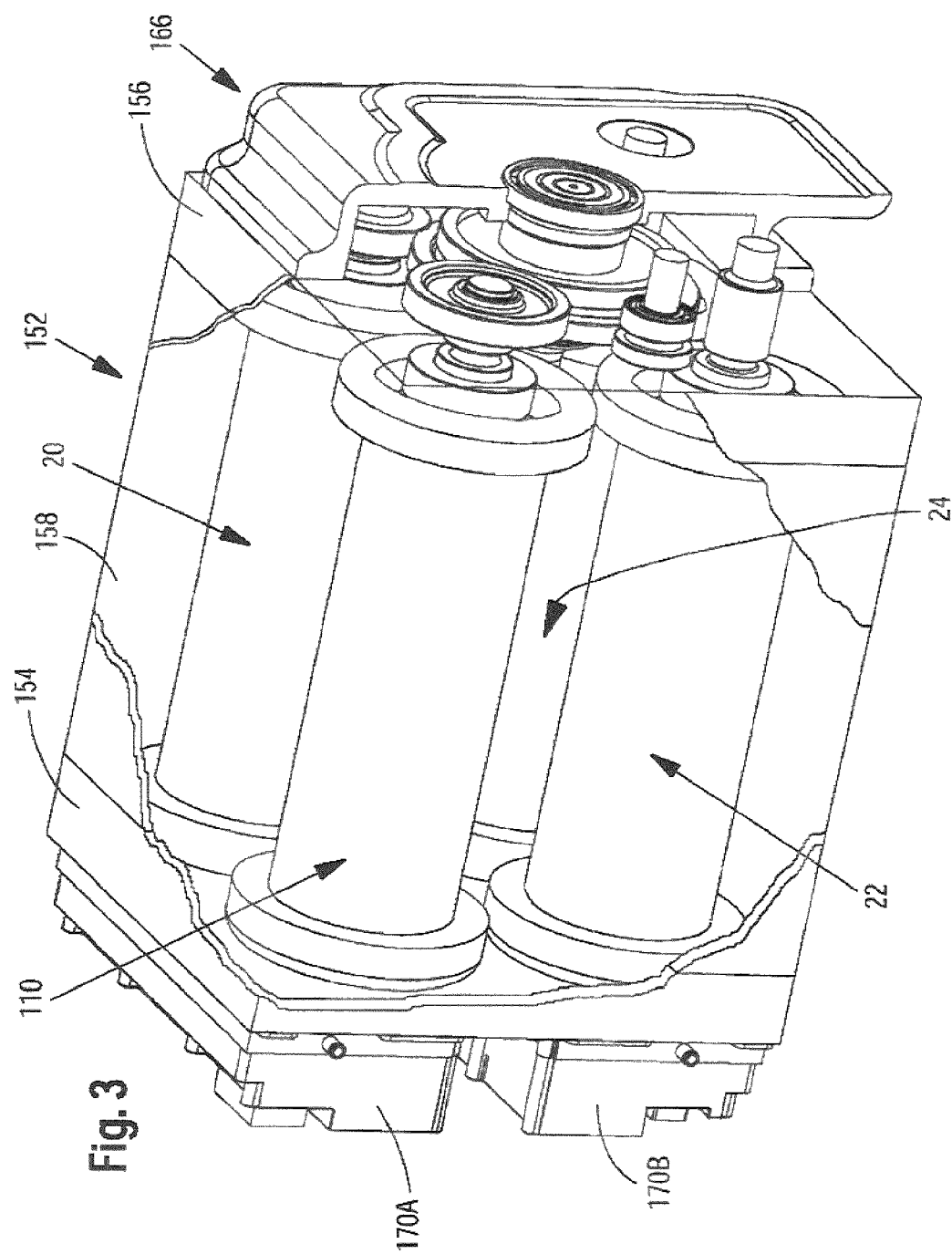
Figure 4:
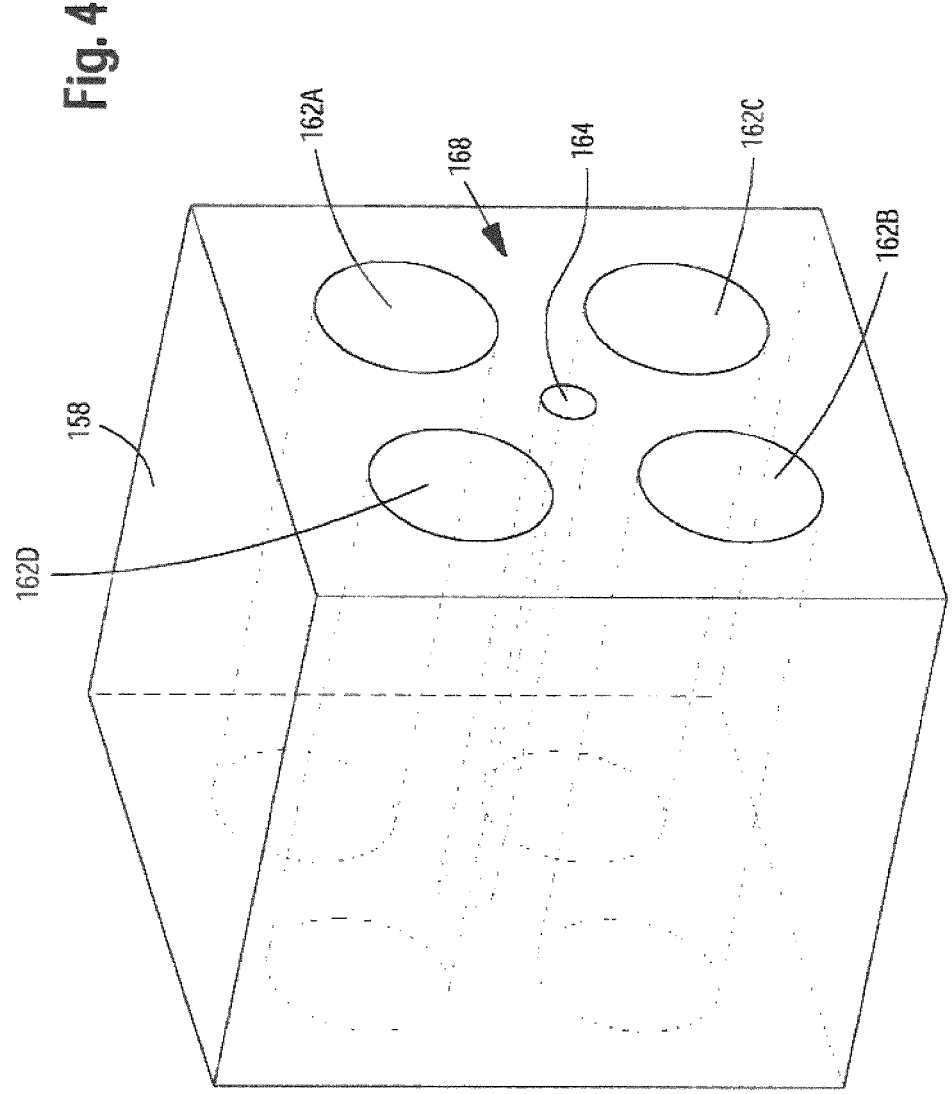
Figure 5:
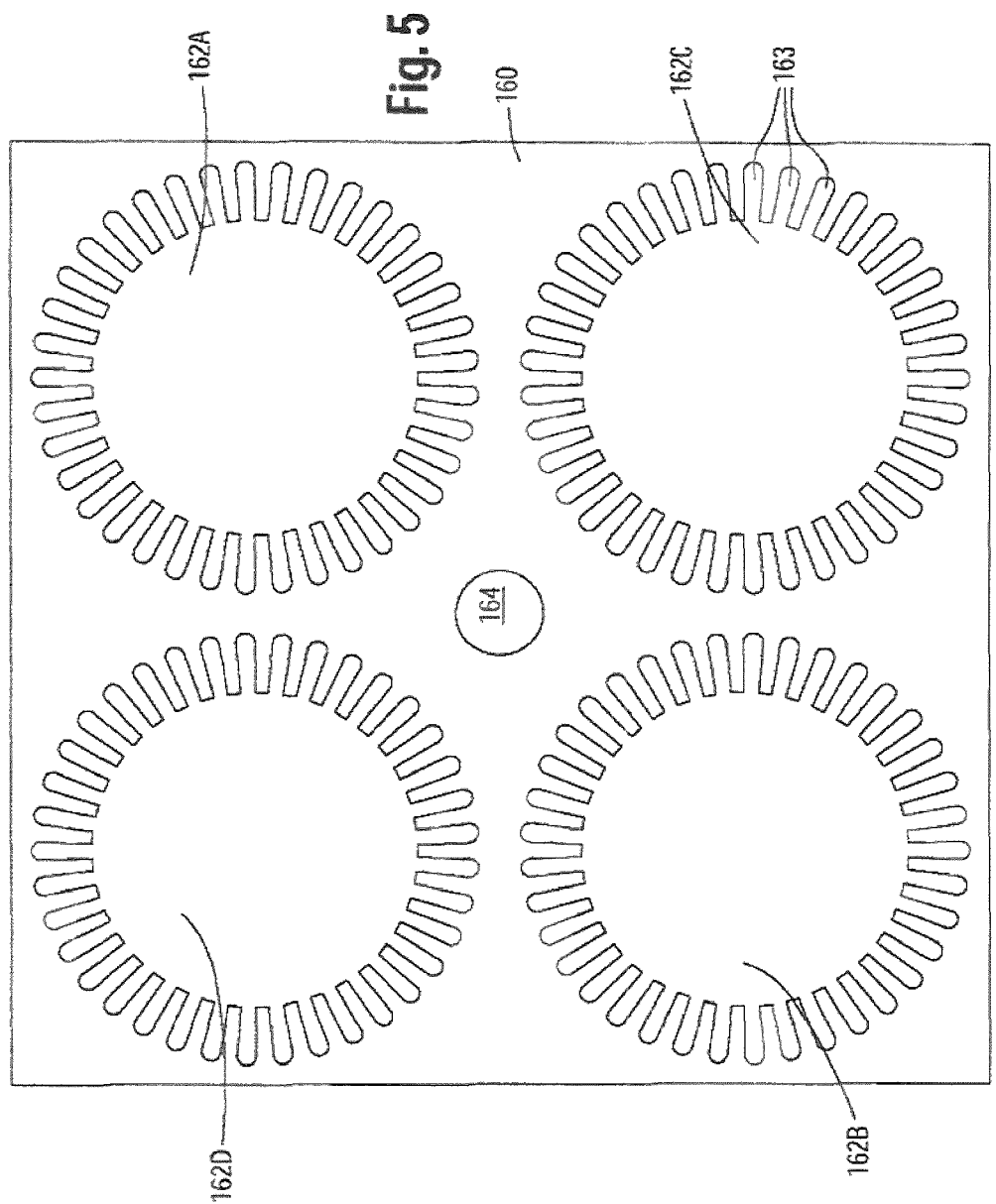
Figure 6:
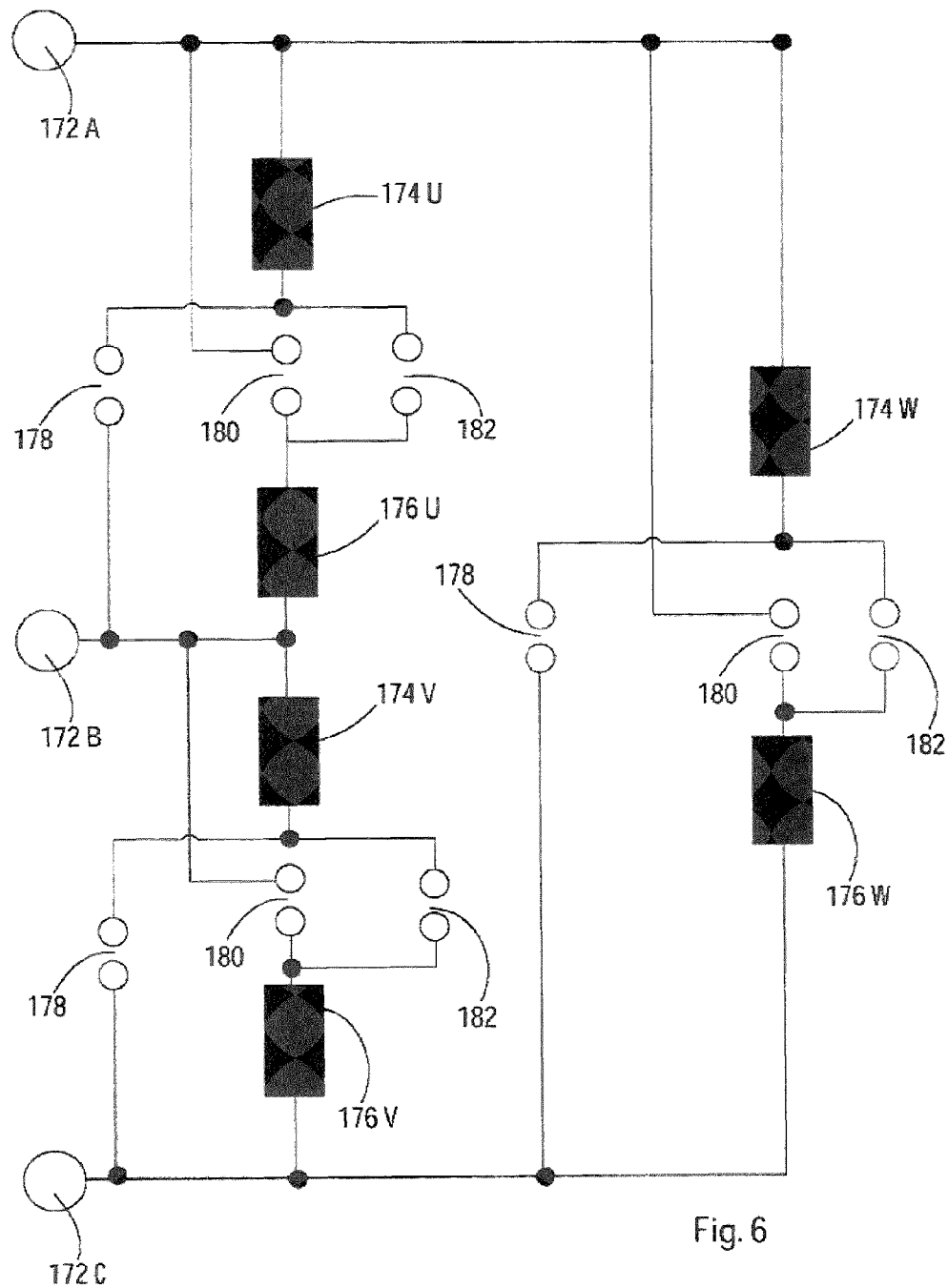

There are various possibilities for constructing and refining the teaching of the present invention in an advantageous way. On the one hand, refer to the claims related to Claim 1 and, on the other hand, refer to the following explanation of the preferred embodiments of the invention with reference to the drawing. In connection with the explanation of the preferred embodiments of the invention with reference to the drawing, preferred constructions and refinements of the teaching are also explained in general. The drawing shows:

FIG. 1, a stick diagram of a first embodiment of a drive system according to the invention, FIG. 2, a stick diagram of a second embodiment of a drive system according to the invention, FIG. 3, a perspective view of an arrangement of electrical machines, FIG. 4, a perspective view of a housing part from FIG. 3, FIG. 5, a sectional view or a top view of a sheet section of the housing part from FIG. 4, and FIG. 6, in a schematic representation, an illustration of possible wiring of two electrical machines.

In the figures, the same or similar assemblies are designated by the same reference symbols. FIG. 1 shows the drive system 10 of an agricultural utility vehicle or tractor not completely shown in the figures. The tractor comprises a drive assembly 12, which has an internal combustion engine 13 and which is designated below with internal combustion engine 13 for the sake of simplicity. The internal combustion engine 13 is coupled to a drive shaft 14, with which other components of the drive system 10 can be driven.

With the drive system 10, a first mechanical output interface 16 is driven, wherein the first output interface 16 is used for driving the rear axle of the tractor (not shown in FIG. 1) and also for driving the front axle or the wheels of the front axle of the tractor (not shown in FIG. 1). A coupling possibility in this respect for a front axle is indicated with the gearwheel designated by the reference symbol 17. Furthermore, there is a second mechanical output interface 18 (can also be designated here as power take-off), which is used for driving a work device (not shown in FIG. 1) that can be coupled to the tractor.

According to the invention, a first, a second, and a third electrical machine 20, 22, 24 are provided. The electrical machines 20, 22, 24 have essentially the same construction structurally and therefore feature comparable power characteristics. The electrical machines 20, 22, and 24 each have a stator 26, 28, and 30, and also a rotor 32, 34, and 36. The rotor 32 is locked in rotation with the shaft 38, the rotor 34 is locked in rotation with the shaft 40, and the rotor 36 is locked in rotation with the shaft 42. The rotor 32 of the first electrical machine 20 is in constant rotating connection with the drive shaft 14 by means of the shaft 38 and an intermediate gear made from two gearwheels 44, 46.

The rotor 34 of the second electrical machine 22 together with the shaft 40 can be locked in rotation with the gearwheel 50 by means of the shifting point 48. The gearwheel 52 is locked in rotation with the shaft 42. Both the gearwheel 50 and also the gearwheel 52 mesh with the gearwheel 54. With the shifting point 56, the gearwheel 54 can be locked in rotation with the first mechanical output interface 16 or the traction driving of the tractor. Thus, the shafts 40, 42 of the rotors 34, 36 of the second electrical machine 22 and the third electrical machine 24 can be coupled synchronously with each other in a way according to the invention, as long as the shifting point 48 from FIG. 1 is located in the left, engaged state.

A summing gear 58 is provided, with which the torque generated by the internal combustion engine 13 and the torque generated by an electrical machine, for example, by the second electrical machine 22, can be summed. The summing gear 58 is constructed essentially in the form of a planetary gear and includes three mechanical interfaces 60, 62, 64. The first interface 60 of the summing gear 58 is locked in rotation with the drive shaft 14 and the ring gear 66 of the summing gear 58. The second mechanical interface 62 is represented by the gearwheel, which is designated by the reference symbol 62 and which is locked in rotation with the hollow shaft 68 and the sun wheel 70 of the summing gear 58. The third mechanical interface 64 is formed by the gearwheel 64, which is designated by the same reference symbols and which is locked in rotation by means of the hollow shaft 72 to the planet carrier 74 of the summing gear 58.

When the shifting point 48 is located in its right, engaged state, the shaft 40 of the second electrical machine 22 is locked in rotation with the gearwheel 76. The gearwheel 76 meshes with the gear 62, which represents the second interface of the summing gear 58. Thus, between the second electrical machine 22 and the second interface 62 of the summing gear 58, a torque flow can be produced. With the shifting point 78, a rotationally locked connection can be produced between the first output interface 16 and the gearwheel 80. The gearwheel 80 meshes with the gearwheel 64 or with the third interface 64 of the summing gear 58.

With the coupling 82 constructed in the form of a plate coupling, a rotationally locked connection between the drive shaft 14 and the shaft 84 can be produced. With the shifting point 86, a rotationally locked connection can be produced between the shaft 84 and the rotating part 88, wherein the rotating part 88 is locked in rotation with the planet carrier 74.

With the shifting point 90, a rotationally locked connection between the shaft 84 and the gearwheel 92 can be produced. The gearwheel 92 meshes with the gearwheel 94, which is locked in rotation with the second mechanical output interface 18. With the shifting point 96, a rotationally locked connection between the shaft 84 and the gearwheel 98 can be produced. The gearwheel 98 meshes with the gearwheel 100, which is locked in rotation with the second mechanical output interface 18. Thus, with the interface 90, a torque flow from the shaft 84 via the gearwheel chain 92, 94 to the second mechanical output interface 18 can be produced, on the one hand, and with the shifting point 96, a torque flow from the shaft 84 via the gearwheel chain 98, 100 to the second mechanical output interface 18 can be produced, on the other hand, each at different transmission ratios.

With the areas 102-108 shown with dashed lines, the following assemblies of the tractor shown in FIG. 1 are indicated: 102 designates the assembly around the internal combustion engine 13, 104 designates the gear case, 106 designates the rear-axle differential gear housing, and 108 designates the power take-off housing. Only schematically is it shown that the first mechanical interface 16 enters into the rear-axle differential gear housing 106.

FIG. 2 shows another embodiment of the present invention, in which a fourth electrical machine 110 is provided. The fourth electrical machine 110 has a stator 112 and a rotor 114. The rotor 114 is locked in rotation with the shaft 116 and the gearwheel 118. The gearwheel 118 meshes with the gearwheel 62 or the second interface 62 of the summing gear 58. The electrical machines 20, 22, 24, 110 have essentially the same construction and feature essentially comparable power characteristics.

The embodiment shown in FIG. 2 in a drive system 10 has an essentially comparable construction to the embodiment of the drive system 10 shown in FIG. 1. One difference here is that the electrical machine 110 always connects with the second interface 62 of the summing gear 58 via the shaft 116 and the gearwheel 118. In this embodiment, the electrical machine 22 cannot be directly connected to the second interface 62 of the summing gear 58, because a shifting point in the embodiment according to FIG. 2 corresponding to the shifting point 48 from FIG. 1 is not provided. The rotor 34 of the electrical machine 22 is always in synchronous rotational connection with the rotor 36 of the electrical machine 24 via the corresponding shafts 40, 42 and the gearwheels 50, 52, 54.

With respect to the control of the electrical machines 20, 22, 24 and optionally 110, the electronic control device 144 is provided. The control device 144 comprises an electronic control unit 146, which—at least as shown in FIGS. 1-2—can also have assemblies of power electronics, also like converter electronics for converting alternating current into direct current and vice versa. The electrical machines 20, 22, 24, 110 are connected to power-supply lines 148A-148D correspondingly to the electronic control unit 146, wherein converter or inverter units 150A-150D are provided. As a function of the control of an electrical machine 20, 22, 24, 110 by the electronic control unit 146, it is possible to operate one of the electrical machines 20, 22, 24, 110 as a generator or as a motor. If an electrical machine 20, 22, 24, 110 is operated as a generator, at least one of the other electrical machines is driven with the electrical energy generated by the electrical machine 20, 22, 24, 110. The electrical power flow is here realized via the power-supply lines 148A-148D, which belong to an intermediate current circuit of the electronic control device 144. Thus, the electrical machine 20, 22, 24, and/or 110 operated as a generator feeds the electrical current generated by it into the intermediate circuit or supplies the electrical current to the electronic control unit 146. Thus, at least one other electrical machine can be powered with this electrical current.

Below, three preferred operating modes of a tractor are discussed, which is equipped with a drive system shown schematically in FIGS. 1-2. In addition to these three preferred operating modes, other operating states of the tractor are conceivable, which, however, will not be discussed explicitly.

In a first operating state, which is possible in the drive system 10 according to FIG. 2, the first electrical machine 20 is operated as a generator. The second and the third electrical machine 22, 24 are operated as motors. The rotors 34, 36 of the second and third electrical machines 22, 24 are connected to the first mechanical output interface 16, that is, the shifting point 56 is located in its left, engaged state. Thus, in this operating mode, the tractor is driven only by the two electrical machines 22, 24. The first operating mode is provided for a driving speed range of a tractor from 0-25 km/h in the forward and backward direction.

This first operating state is also possible in the drive system 10 from FIG. 1. Here, the shifting point 48 is located in its left, engaged state and the shifting point 56 is located in its left, engaged state. Thus, the two electrical machines 22, 24 are coupled to each other synchronously via the gearwheel 54 and drive the first mechanical output interface 16.

In a second operating state, which is possible in the drive system 10 according to FIG. 2, the fourth electrical machine 110 operated as a generator can be driven with a part of the mechanical torque generated by the drive assembly 12. With the electrical power generated by the fourth electrical machine 110, the second and third electrical machines 22, 24 are operated as motors. The mechanical torque generated by the second and third electrical machines 22, 24 can be transmitted with another part of the mechanical torque generated by the drive assembly 12 to the first mechanical output interface 16. In this operating state, the shifting point 56 is located in its left, engaged state, and the shifting point 78 is located in its right, engaged state. Accordingly, the mechanical torque generated by the drive assembly 12 is branched in the summing gear 58, on the one hand, to the fourth electrical machine 110 (via the interface 60 of the planetary gear 58, the internal gear 66, the planet carrier 74, the sun wheel 70, the hollow shaft 68, the gearwheel 62, the gearwheel 118, and the shaft 116) and, on the other hand, to the output interface 16 (via the interface 60, the internal gear 66, the planet carrier 74, the hollow shaft 72, the gearwheel 64, the gearwheel 80, and thus to the interface). In this second operating state, the drive system 10 is operated in a "speed-split" configuration. The second operating state is intended for slow forward travel up to ca. 25 km/h with heavy towing work of a tractor.

This second operating state would also be possible in the drive system 10 according to FIG. 1, if the shifting points 48 are located in their right, engaged state and the shifting point 56 is located in its left, engaged state and when the shifting point 78 is located in its right, engaged state. Then the second electrical machine 22 operated as a generator can be driven with a part of the mechanical torque generated by the drive assembly 12. The third electrical machine 24 is operated as a motor with the electrical energy generated by the second electrical machine 22. The mechanical torque generated by the third electrical machines 24 can be transmitted to the first mechanical output interface 16 with another part of the mechanical torque generated by the drive assembly 12 (via the interface 60, the internal gear 66, the planet carrier 74, the hollow shaft 72, the gearwheels 64 and 80).

In a third operating state, which is possible in the drive system 10 according to FIG. 2, the first electrical machine 20 is operated as a generator. The fourth electrical machine 110 is operated as a motor. The mechanical torque generated by the fourth electrical machine 110 can be summed with the mechanical torque generated by the drive assembly 12 in the summing gear 58 and transmitted to the first mechanical output interface 16. In this operating state, the shifting point 56 is located in its right, unengaged state and the shifting point 78 is located in its right, engaged state. In this third operating state, the drive system 10 is operated in a "torque-split" configuration. The third operating state is intended for high traveling speeds of a tractor, for example, speeds of 25-50 km/h. Accordingly, the rotational speed of the first output interface 16 can be increased or reduced with the fourth electrical machine 110—according to their rotational speed and their rotational direction—by a given rotational speed of the drive assembly 12. Thus, for example, the tractor could be driven at a speed of ca. 38 km/h just by the drive assembly 12 without the interaction of the fourth electrical machine 110. By connecting the fourth electrical machine 110 for a constant rotational speed of the drive assembly, the vehicle could then be driven faster or slower by ca. 12 km/h, thus, the rotational speed at the output interface 16 can be reduced or increased accordingly with the fourth electrical machine 110.

The third operating state is also conceivable in the drive system 10 according to FIG. 1. The shifting point 48 is located in its right, engaged state and the shifting point 78 is located in its right, engaged state. The first electrical machine 20 is operated as a generator and the second electrical machine 22 is operated as a motor. Thus, the mechanical torque generated by the second electrical machine 22 is transmitted via the shaft 40 to the gearwheels 76, 62 to the summing gear 58 and can be summed with the torque generated by the drive assembly 12 and input into the summing gear 58 via the drive shaft 14 and transmitted via the gearwheels 64, 80 to the first mechanical output interface 18.

In the three previously described operating modes, the fourth electrical machine 110 can be operated as a motor in the drive system 10 shown in FIG. 2. The torque generated by the fourth electrical machine 110 can then be transmitted to the second mechanical output interface 18, when the shifting point 86 is located in its engaged state and either the shifting point 90 or the shifting point 96 is similarly located in its engaged state. Thus, the torque generated by the fourth electrical machine 110 is transmitted via the shaft 116, the gearwheels 118, 62, the hollow shaft 68, the sun wheel 70, the planet carrier 74, the shaft 84, and either to the gearwheel chain 92, 94 or to the gearwheel chain 98, 100. If the plate coupling 82 from the FIGS. 1 and 2 is engaged, in the summing gear 58, the mechanical torque generated by the fourth electrical machine 110 can be transmitted with a part of the mechanical torque generated by the drive assembly 12 to the second mechanical output interface 18. Accordingly, the second mechanical output interface 18 can be driven, on the one hand, only by the torque generated by the fourth electrical machine 110. On the other hand, the second mechanical output interface 18 can be summed and driven by the mechanical torque generated by the fourth electrical machine 110 and by a part of the mechanical torque generated by the drive assembly 12.

The second mechanical drive interface 18 can then be driven in a comparable way with the drive system 10 from FIG. 1, if the shifting point 48 is located in its right, engaged state and the second electrical machine 22 is operated as a motor. Then, namely the mechanical torque generated by the second electrical machine is transmitted via the gearwheels 76, 62 and the hollow shaft 68 to the sun wheel 70 of the summing gear 58. Via the planet carrier 74, this torque is generated for an engaged shifting point 86 via the shaft 84 either via the gearwheel chain 92, 94 or via the gearwheel chain 98, 100 to the second mechanical output interface 18, according to whether the shifting point 90 or the shifting point 96 is located in its engaged state. In this way, the first electrical machine 20 was preferably operated as a generator and the third electrical machine 24 was operated as a motor and thus can be connected to the third electrical machine 24 for the engaged shifting point 78 to the first output interface 16.

In FIG. 3, a housing arrangement 152 is shown, in or on which according to the invention the four electrical machines 20, 22, 24, and 110 are arranged or housed. Every two electrical machines—e.g., 22, 24 or 22, 110—are arranged spatially adjacent to each other. The electrical machine 20 is arranged adjacent to the electrical machines 110 and 24 and also adjacent to the electrical machine 22 via the diagonals. This applies analogously for the other three electrical machines 22, 24, 110.

The stators 26, 28, 30, 112 of the electrical machines 20, 22, 24, 110 are arranged in the common housing arrangement 152. The electrical machines 20, 22, 24, 110 are arranged in the housing arrangement 152 such that the shafts 38, 40, 42, 116 of the rotors 32, 34, 36, 114 of the electrical machines 20, 22, 24, 110 emerge from the housing arrangement 152 on one side. The housing arrangement 152 has two closing parts 154, 156 each constructed in the form of an end plate. The stators 26, 28, 30, 112 of the four electrical machines 20, 22, 24, 110 can be mounted on the two closing parts 154, 156.

The closing part 154 is arranged on one side of the housing arrangement 152. The other closing part 156 is arranged on the opposing side of the housing arrangement 152.

The housing arrangement 152 has a middle part 158, which has a metal construction housing the four electrical machines 20, 22, 24, 110. The metal construction is constructed in the form of a metal stack block and has individual sheets combined to form a sheet stack. Such a sheet 160 of the sheet stack forming the middle part 158 is shown in FIG. 5. The sheet 160 has essentially circular recesses 162A-162D for the stators 26, 28, 30, 112 of the four electrical machines 20, 22, 24, 110. The grooves/channels 163 arranged essentially in the radial direction of a recess 162A-162D are used for holding the not-shown stator windings. The drive shaft 14 runs through the recess 164. Corresponding recesses are also provided in the two closing parts 154, 156. Thus, the shaft 14 extends through the housing arrangement 152.

FIG. 4 shows the middle part 158 of the housing arrangement 152 assembled from the individual sheets 160, where, for simpler illustration, the four recesses 162A-162D (without the grooves/channels 163) can be seen for the four electrical machines 20, 22, 24, 110 and also the recess 164 arranged in the middle for the drive shaft 14. Thus, the middle part 158 of the housing arrangement 152 can be formed, such that several sheets 160 shown in FIG. 5 are mounted electrically insulated from each other on the end 168 of the middle part 158 shown in FIG. 4.

The electrical machines 20, 22, 24, 110 are arranged spatially such that their shafts 38, 40, 42, 116 are oriented essentially parallel to each other and project from one side of the housing arrangement 152; they pass namely through the right closing part 156. Merely schematically—a part of the gear structure of the gear housing 104 shown, for example, in FIGS. 1 and 2 and designated in FIG. 3 by the reference symbol 166—is arranged downstream of the middle part 158 viewed from the right in FIG. 3. Shown only schematically—two power electronic assemblies 170A and 170B, which are mounted on the left closing part 154 of the housing arrangement 152 and which are each electrically connected to the electrical machines 20, 22, 24, 110—are to be seen from the middle part 158 viewed from the left in FIG. 3.

In a schematic representation, FIG. 6 shows an illustration of possible wiring of two electrical machines. For example, the three connections of a converter not shown in FIG. 6 and to which the two electrical machines or their windings 174U, 174V, 174W, 176U, 176V, 176W are connected, are shown with the reference symbols 172A-172C. Here, the windings 174U, 174V, 174W belong to the first electrical machine and the windings 176U, 176V, 176W belong to the second electrical machine. Switches, which can be opened or closed, so that an electrical connection line can be made or broken between two circuits of a switch shown there, are indicated by the reference symbols 178, 180, and 182. If the switches 178 and 180 are closed and the switches 182 are opened, the two electrical machines, whose windings 174U, 174V, 174W, 176U, 176V, 176W are shown in FIG. 6, are connected to each other electrically in parallel. If the switches 178 and 180 are opened and the switches 182 are closed, the two electrical machines, whose windings 174U, 174V, 174W, 176U, 176V, 176W are shown in FIG. 6, are connected to each other electrically in series.

Thus, with the electrical switching circuit shown in FIG. 6, the two electrical machines that can be operated as motors are connected to each other electrically in parallel or electrically in series. Correspondingly, the windings 174U, 174V, 174W or 176U, 176V, 176W of an electrical machine operated as a motor are connected internally electrically in parallel, in series, in a star arrangement, or in a triangle arrangement, which is not elaborated on in detail in FIG. 6.

Finally, it should be noted, in particular, that the embodiments explained above are used merely for describing the claimed teaching, which is not limited, however, to the embodiments.

The invention claimed is:

1. A drive system for an agricultural or industrial utility vehicle, with a drive assembly, having a drive shaft driven by an engine, generating a mechanical torque, a first and a second electrical machine, a first mechanical output interface drivingly connected with the drive assembly, and a second mechanical output interface selectively drivingly connected with the drive assembly, the first and second electrical machines each having a rotor, each rotor being locked in rotation with a shaft, the drive assembly being in torque flow with the shaft of the first electrical machine, a work device being coupled to the vehicle and being driven mechanically with the second mechanical output interface, the shaft of the second electrical machine being selectively connected to the first mechanical output interface, wherein:
a third electrical machine is provided, a shaft of which is selectively connected to the first mechanical output interface, and the shafts of the second and third electrical machines are coupled to each other synchronously.

2. A drive system according to claim 1, wherein the shafts of the second and third electrical machines are always coupled synchronously.

3. A drive system according to claim 1, wherein at least one of the electrical machines is operated as a generator and that at least one of the two other electrical machines is driven by the electrical energy generated by the at least one of the electrical machines.

4. A drive system according to claim 1, wherein an intermediate current circuit is provided, in which one of the electrical machines is operated as a generator and supplies the electrical current generated by it and with which at least one of the electrical machines is powered with electrical current, and the intermediate current circuit has a direct current circuit.

5. A drive system according to claim 1, wherein at least two of the electrical machines have at least one of essentially the same construction and essentially comparable power characteristics.

6. A drive system according to claim, wherein a switching device is provided with which at least two of the electrical machines are operated as motors and are connected to each other one of electrically in parallel and electrically in series.

7. A drive system according to claim 1, wherein two of the electrical machines are operated as motors, wherein for changing the load state of at least one of the electrical machines, two of the electrical machines are switched from one of an electrical series circuit into an electrical parallel circuit or and from an electrical parallel circuit into an electrical series circuit.

8. A drive system according to claim 1, wherein for changing windings of the electrical machines, wherein the electrical machines are operated as motors, are connected internally electrically one of in parallel, in series, in a star arrangement, and in a triangle arrangement.

9. A drive system according to claim 1, wherein for changing wiring of one of the electrical machines, wherein said one of the electrical machines is operated as a motor, one of the other two electrical machines coupled synchronously with said one of the electrical machines is initially controlled by a controller such that with said one of the other two electrical machines, an operation free of torque interruptions is possible in a no-load state of the electrical machine to be switched and that the wiring of the electrical machine to be switched is changed in the load state of the other electrical machine.

10. A drive system according to claim 1, wherein at least two of the electrical machines are operated as motors and are controlled by a controller such that possible torque non-uniformity of one of said at least two of the electrical machines is at least largely equalized by the other of said at least two of the electrical machines on the basis of the synchronous coupling.

11. A drive system according to claim 1, wherein one of the electrical machines is operated such that a given field weakening range is not exceeded.

12. A drive system according to claim 1, wherein at least two of the electrical machines are one of arranged in a common housing arrangement, and arranged spatially adjacent to each other.

13. A drive system according to claim 1, wherein at least two of the electrical machines are arranged spatially, such that their shafts are oriented essentially parallel to each other.

14. A drive system according to claim 1, wherein a fourth electrical machine is provided, which is coupled to at least one of the first and the second mechanical output interface.

15. A drive system according to claim 1, wherein for summing the torque generated by the drive assembly and the torque generated by an electrical machine, there is a summing gear with three mechanical interfaces, a first interface of the summing gear being coupled to the drive shaft driven by the engine, a second interface of the summing gear being coupled to the shaft of one of the electrical machines, and wherein a third interface of the summing gear is selectively coupled to at least one of the first mechanical output interface and the second mechanical output interface of the drive system.

16. A drive system according to claim 15, wherein the summing gear has a planetary gear, the drive shaft driven by the engine is locked in rotation with an internal gear of the planetary gear, a planet carrier of the planetary gear is selectively coupled to the first mechanical output interface, and wherein a sun wheel of the planetary gear is selectively coupled to one of the second, third, and fourth electrical machines.

17. A drive system according to claim 16, wherein a shaft of the fourth electrical machine is rotationally connected to the sun wheel of the planetary gear.

18. A drive system according to claim 15, wherein at least one of a planet carrier of a planetary gear and the drive shaft driven by the engine is selectively coupled to the second output interface.

19. A drive system according to claim 14, having a first operating state in which the first electrical machine is operated as a generator and the second and third electrical machines are operated as motors and connected to the first mechanical output interface.

20. A drive system according to claim 19, having a second operating state in which, with a part of the mechanical torque generated by the drive assembly, the fourth electrical machine is operated as a generator, in which the second and third electrical machines are operated as motors, and wherein the mechanical torque generated by the second and the third electrical machines is transmitted with another part of the mechanical torque generated by the drive assembly to the first mechanical output interface.

21. A drive system according to claim 20, having a third operating state in which the first electrical machine is operated as a generator, in which the fourth electrical machine is operated as a motor and wherein the mechanical torque generated by the fourth electrical machine is summed with the mechanical torque generated by the drive assembly and transmitted to the first mechanical output interface.

22. A drive system according to claim 14, wherein the fourth electrical machine is operated as a motor and wherein the torque generated by the fourth electrical machine and, if a corresponding coupling is engaged, at least one part of the mechanical torque generated by the drive assembly is transmitted to the second mechanical output interface.

23. A method for operating a drive system for an agricultural or industrial utility vehicle, the drive system having a drive assembly, having a drive shaft driven by an engine, generating a mechanical torque, a first and a second electrical machine, a first mechanical output interface drivingly connected with the drive assembly, and a second mechanical output interface selectively drivingly connected with the drive assembly, wherein the first and second electrical machines have rotors, each rotor being locked in rotation with a shaft, the drive assembly being in a torque flow with the shaft of the first electrical machine, a work device being coupled to the second output interface and being driven mechanically, the shaft of the second electrical machine being selectively connected to the first mechanical output interface, wherein:

a third electrical machine is provided, a shaft of which is selectively connected to the first mechanical output interface, and the shafts of the second and third electrical machines are coupled to each other synchronously.

24. A method according to claim 23, wherein a switching device is provided, with which at least two of the electrical machines are operated as motors and are wired one of electrically in parallel to each other and electrically in series to each other.

25. A method according to claim 23, wherein two of the electrical machines are operated as motors, and wherein for changing the load state of at least one of the electrical machines, two of the electrical machines are switched from one of an electrical series circuit to an electrical parallel circuit and from an electrical parallel circuit to an electrical series circuit.

26. A method according to claim 23, wherein windings of an electrical machine being operated as a motor are internally connected electrically one of in parallel, in series, in a star arrangement, and in a triangle arrangement.

27. A method according to claim 23, wherein changing wiring of one of the electrical machines, wherein said one of the electrical machines is operated as a motor, the other electrical machine of said electrical machines is synchronously coupled to said one of the electrical machines is initially controlled by a controller, such that, with the other electrical machine, operation free of torque interruption for a no-load state of the one of the electrical machines, which is the electrical machine to be switched, is possible and that the wiring of the electrical machine to be switched is changed in the load state of the other electrical machine.

28. A method according to claim 23, wherein at least two of the electrical machines are operated as motors and are controlled, such that possible torque non-uniformity of an individual of the electrical machines is at least largely equalized by another of the electrical machines on the basis of the synchronous coupling, in which the two or more of the electrical machines are operated as motors and are coupled to at least one of the first and/or second mechanical output interface.

29. A method according to claim 23, wherein one of the electrical machines is operated such that a given field weakening range is not exceeded.

* * * * *